United States Patent
Singhal et al.

(10) Patent No.: US 11,083,216 B2
(45) Date of Patent: Aug. 10, 2021

(54) GRAPHENE BASED TOBACCO SMOKE FILTER AND A METHOD FOR SYNTHESIZING GRAPHENE COMPOSITION

(71) Applicant: LOG 9 MATERIALS SCIENTIFIC PRIVATE LIMITED, Saharanpur (IN)

(72) Inventors: Akshay Vivek Singhal, Saharanpur (IN); Purnendu, Sitamarhi (IN)

(73) Assignee: LOG 9 MATERIALS SCIENTIFIC PRIVATE LIMITED, Saharanpur (IN)

( * ) Notice: Subject to any disclaimer, the term of this patent is extended or adjusted under 35 U.S.C. 154(b) by 171 days.

(21) Appl. No.: 16/097,569

(22) PCT Filed: Apr. 27, 2017

(86) PCT No.: PCT/IN2017/050149
§ 371 (c)(1),
(2) Date: Oct. 29, 2018

(87) PCT Pub. No.: WO2017/187453
PCT Pub. Date: Nov. 2, 2017

(65) Prior Publication Data
US 2019/0161412 A1    May 30, 2019

(30) Foreign Application Priority Data

Apr. 29, 2016 (IN) .............................. 201611015050

(51) Int. Cl.
*A24D 3/04* (2006.01)
*A24D 3/06* (2006.01)
(Continued)

(52) U.S. Cl.
CPC ............ *A24D 3/048* (2013.01); *A24D 3/061* (2013.01); *A24D 3/10* (2013.01); *A24D 3/16* (2013.01);
(Continued)

(58) Field of Classification Search
None
See application file for complete search history.

(56) References Cited

U.S. PATENT DOCUMENTS

2014/0011034 A1* 1/2014 Majumder ............. C09K 8/805
428/406
2014/0197353 A1* 7/2014 Hong ....................... C04B 35/45
252/71

(Continued)

FOREIGN PATENT DOCUMENTS

CN        104489922 A    *    4/2015

*Primary Examiner* — Erin Snelting
(74) *Attorney, Agent, or Firm* — Barry Choobin; Patent 360LLC

(57) ABSTRACT

The embodiments herein provide a filter for cigarette comprising graphene nano-composite based material enclosed in a casing. The filter is reusable and is plugged to any cigarette, or tobacco smoking products. The filter is a stand-alone product or manufactured integrally with each individual cigarette. The filter provides a safe smoking option to tobacco smokers without changing their smoking habits by reducing the tar content and other toxic chemicals in the inhaled smoke. The graphene based nanocomposite filter adsorbs the toxic agents from the smoke (of cigarette, beedi, hookah etc). The filter is fabricated by treating ceramic particles and coating them with carbon particles. The carbon particles are carbonized. The ceramic particles coated with carbon are segregated based on shape and size and treated chemically to convert carbon into graphene under inert conditions. The graphene coated particles are chemically functionalized for improved filtration.

4 Claims, 4 Drawing Sheets

(51) Int. Cl.

| | |
|---|---|
| *A24D 3/16* | (2006.01) |
| *C04B 35/626* | (2006.01) |
| *C04B 35/628* | (2006.01) |
| *C04B 41/00* | (2006.01) |
| *C04B 41/53* | (2006.01) |
| *C04B 41/91* | (2006.01) |
| *A24F 7/04* | (2006.01) |
| *C01B 32/205* | (2017.01) |
| *C01B 32/225* | (2017.01) |
| *A24D 3/10* | (2006.01) |
| *B01D 53/02* | (2006.01) |
| *C04B 35/528* | (2006.01) |
| *C04B 35/64* | (2006.01) |

(52) U.S. Cl.
CPC ............... *A24D 3/163* (2013.01); *A24F 7/04* (2013.01); *B01D 53/02* (2013.01); *C01B 32/205* (2017.08); *C01B 32/225* (2017.08); *C04B 35/528* (2013.01); *C04B 35/6264* (2013.01); *C04B 35/6267* (2013.01); *C04B 35/62605* (2013.01); *C04B 35/62839* (2013.01); *C04B 35/64* (2013.01); *C04B 41/009* (2013.01); *C04B 41/5353* (2013.01); *C04B 41/91* (2013.01); *B01D 2253/102* (2013.01); *B01D 2253/25* (2013.01); *B01D 2257/406* (2013.01); *B01D 2257/7022* (2013.01); *B01D 2259/4541* (2013.01); *C04B 2235/3217* (2013.01); *C04B 2235/3232* (2013.01); *C04B 2235/3244* (2013.01); *C04B 2235/3418* (2013.01); *C04B 2235/422* (2013.01); *C04B 2235/52* (2013.01); *C04B 2235/5427* (2013.01); *C04B 2235/5436* (2013.01); *C04B 2235/656* (2013.01); *C04B 2235/658* (2013.01); *C04B 2235/95* (2013.01)

(56) References Cited

U.S. PATENT DOCUMENTS

2018/0228209 A1\* 8/2018 Tang .................... B01J 20/3293
2019/0000136 A1\* 1/2019 Zhang ................ B01D 53/0407

\* cited by examiner

GRAPHENE BASED TOBACCO SMOKE FILTER AND A METHOD FOR SYNTHESIZING GRAPHENE COMPOSITION

CROSS-REFERENCE TO RELATED APPLICATIONS

This Patent Application is a National Phase Application corresponding to the PCT Application No. PCT/IN2017/050149 filed on Apr. 27, 2017 with the title "A GRAPHENE BASED TOBACCO SMOKE FILTER AND A METHOD FOR SYNTHESIZING GRAPHENE COMPOSITION". This Patent Application claims the priority of the Indian Provisional Patent Application No. 201611015050 filed on Apr. 29, 2016 with the title "SYSTEM AND METHOD FOR FILTERATION OF TOBACCO SMOKE USING A GRAPHENE BASED TOBACCO SMOKE FILTER", the contents of which is included herein by the way of reference.

BACKGROUND

Technical Field

The embodiment herein are generally related to a field of graphene nanotechnology and the applications of graphene nanotechnology in consumer products. The embodiment herein are particularly related to a tobacco filter for filtering tobacco smoke. The embodiment herein are more particularly related to a tobacco filter with graphene-based materials and a method synthesizing graphene-based materials.

Description of the Related Art

Graphene, a two-dimensional (2D) structure consisting of sp2-hybridized carbons with only one atomic thickness, is called "the wonder material" due to its extraordinary and widespread applications. Graphene has received widespread attention as a new type of adsorbent due to outstanding ability or characteristics for the removal of various harmful chemicals and compounds from gaseous and aqueous solutions. Various organic compounds get trapped between the graphene layers, which provide an efficient filtration. The organic compounds are trapped due to chemical adsorption (chemisorption) between the layers.

A burning cigarette produces smoke, which is a complex concentrated aerosol of liquid particles suspended in a gaseous phase and composed of atmospheric oxygen, nitrogen, carbon monoxide and carbon dioxide generated from the cigarette. These sub-micron level liquid particles present in the aerosol are themselves a complex composition of multiple compounds generated from distillation, pyrolysis, and combustion of tobacco. Thus, the chemical compounds present in a cigarette smoke are either bound to the aerosol phase or are free in the gaseous phase. These compounds generated during a burning of tobacco are either directly distilled into the smoke or they react among them. The reaction products resulting from such chemical reactions are then distilled into the smoke. There are more than 7000 different compounds present in the cigarette smoke. Many of the compounds present in the cigarette smoke are toxic and possess severe health risks. Major health risks of cigarette smoking include respiratory tract related disorders, and cardiovascular risk. The studies have revealed that 1, 3 butadiene is most significant carcinogen. The acrolein and acetalydehyde are responsible for generating the greatest risk of respiratory tract related disorders. The cardiovascular risk is primarily due to cyanide, arsenic, and the cresols. Other chemical compounds which possess significant health risk include, N-nitrosamines, and poly-cyclic aromatic hydrocarbons (PAHs).

Functionalized graphene layers having functional groups such as —CHO, —C=O, —COOH, —OH, etc., on the graphene basal plane show excellent adsorption of organic compounds. This ability of graphene is used to filter the various toxic components from the cigarette smoke. However, standalone use of graphene in cigarette filter is not a cost effective route to exploit graphene's extraordinary properties for a safer smoking solution. Further, the structural and chemical integrity of filter is not ascertained with pristine graphene based filter.

Hence, there is a need for a cost-effective and reusable filter that removes toxic chemical compounds from cigarette smoke without losing the chemical and structural integrity during smoking, and also allows easy passage of smoke. There is also a need for designing this filter so as to facilitate use with a plurality of grades, classes or brands of tobacco smoking product. Yet there is a need for graphene based tobacco smoke filter. Still there is a need for a tobacco filter with graphene-based composition and a method synthesizing graphene-based composition.

The above-mentioned shortcomings, disadvantages and problems are addressed herein, which will be understood by reading and studying the following specification.

OBJECTS OF THE EMBODIMENTS HEREIN

The primary object of the embodiment herein is to provide a graphene based filter for removing toxic chemical compounds from cigarette smoke and providing a safe alternative to the smokers.

Another object of the embodiment herein is to provide a cigarette filter, which is a standalone product and is attachable to any brand of class or grade of tobacco smoking products such as cigarettes, cigars, cigarillos, little cigars, bidis, hookah, kreteks, tobacco pipes, e-cigarettes, etc.

Yet another object of the embodiment herein is to provide a graphene based filter with a graphene composition comprising a nano-composite of graphene and ceramics.

Yet another object of the embodiment herein is to provide a graphene based filter for tobacco with the graphene-based composition in either granular form or sintered ceramic form.

Yet another object of the embodiment herein is to provide a graphene based filter with the graphene-based composition functionalized chemically to remove the toxic organic chemical compounds from inhaled smoke.

Yet another object of the embodiment herein is to provide a graphene based filter with the graphene-based composition for removing toxins from inhaled smoke.

Yet another object of the embodiment herein is to provide a graphene based filter with the graphene-based composition for reducing the tar content in inhaled smoke.

Yet another object of the embodiment herein is to provide a graphene based filter with the graphene-based composition for tobacco smoking products, with a minimum effect on the nicotine content of the inhaled smoke.

These and other objects and advantages of the embodiment herein will become readily apparent from the following detailed description taken in conjunction with the accompanying drawings.

SUMMARY

The various embodiments herein provide a graphene based filter, which removes tar and toxic chemical compounds from tobacco smoke and provides a safe smoking alternative for smokers.

According to one embodiment herein, a method of fabricating a cigarette filter made of graphene ceramic nano-composite material is provided. The method comprises the following steps. The ceramic material is washed with an acid. The acid de-contaminates the surface of ceramic material. The acid also activates the surface of the ceramic material. The acid is taken in a pre-determined concentration. The pre-determined concentration of the acid is in a range of 10-60% v/v. The ceramic particles are annealed at a pre-determined temperature range. The pre-determined temperature range is 600-900° C. The ceramic particles are coated with a carbon precursor using a solvent to obtain coated ceramic particles. The ceramic particles are mixed with carbon precursor in a liquid phase or a dispersion phase. After mixing the carbon precursor, solvent and the ceramic particles the carbon precursor is dried by heating at a pre-determined temperature range. The concentration of carbon precursor is in the range of 5-20% w/w. The carbon precursor present on the surface of the ceramic particles is carbonized by heating at a pre-determined temperature range in air. The heating converts the carbon precursor into amorphous carbon layer. The pre-determined temperature range is 200-400° C. After heating, the ceramic particles coated with amorphous carbon are obtained. The ceramic particles coated with amorphous carbon are segregated based on particle size and particle shape and die compaction. The ceramic particles coated with amorphous carbon are segregated based on the particle size in a range of 300-900 microns in diameter. The ceramic particles coated with amorphous carbon are segregated based on a circular shape with irregular and uneven surface. The ceramic particles coated with amorphous carbon are annealed at a predetermined temperature range in an inert atmospheric condition. The annealing converts the amorphous carbon into graphene. The predetermined temperature range is 600-900° C. The inert atmosphere comprises argon, nitrogen and hydrogen. The annealing yields ceramic particles with graphene or graphene nano-composite material. The ceramic particles with graphene or graphene ceramic nano-composite material are chemically treated for activation of surface. The chemical treatment is an acid treatment. The acid is selected from a group consisting of sulphuric acid, hydrochloric acid and nitric acid. The acid treatment makes the graphene layers porous and increases chemisorptions or adsorption of a plurality of toxic compounds from cigarette smoke. The toxic compounds adsorbed are ammonia, formaldehyde, mainstream total particulate matter (MS-TPM), nicotine, tar and nitrosamines. A plurality of functional groups are incorporated onto the surface of the graphene ceramic nano-composite material by a chemical functionalization, based on the toxins or the compounds to be adsorbed from cigarette smoke. The functional groups are selected from a group consisting of oxygen-based functional groups, Sulphur based functional groups, Nitrogen based functional groups, Halogen based functional group, Phosphorus based functional group, and Boron based functional groups. The oxygen-based functional groups are added on the surface of graphene ceramic nano-composite material by heating the graphene nano-composite material in an ambient air (calcination) and a chemical treatment. The Sulphur based functional groups, Nitrogen based functional groups, Halogen based functional group, Phosphorus based functional group, and Boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

A tobacco smoke filter is fabricated by packing the graphene ceramic nano-composite material into a pipe like casing. The graphene ceramic nano-composite material is filled in an amount of 0.5-1.5 grams.

According to one embodiment herein, the ceramic material is selected from a group consisting of silica, alumina, titanium oxide and zirconium oxide.

According to one embodiment herein, the carbon precursor is selected from a group consisting of sugar, tar and asphalt.

According to one embodiment herein, the solvent is selected from a group consisting of water, ethanol and hexane.

According to one embodiment herein, the graphene ceramic nano-composite material filter for cigarette tobacco smoke comprises a mouth piece, a filtration column, a front plug, a back plug, a cigarette holding section and a cylindrical pipe to fix the cigarette. The filtration column comprises grapheme ceramic nano-composite material. The filtration column is positioned between the front plug and the back plug.

According to one embodiment herein, an amount of the graphene ceramic nano-composite material filled in the filtration column is in a range of 0.5-1.5 grams.

According to one embodiment herein, the front plug and the back plug are fabricated from porous material. The porous material is cellulose acetate, cotton, plastic wool or plastic mesh, etc.

According to one embodiment herein, the graphene ceramic nano-composite material filter is designed to adsorb the toxic compounds from cigarette smoke. The toxic compounds adsorbed from cigarette smoke are ammonia, formaldehyde, mainstream total particulate matter (MS-TPM), nicotine, tar and nitrosamines. A plurality of functional groups are incorporated onto the surface of the graphene ceramic nano-composite material by a chemical functionalization depending on the toxins or the compounds to be adsorbed from cigarette smoke. The functional groups are selected from a group consisting of oxygen based functional groups, sulphur based functional groups, nitrogen based functional groups, halogen based functional group, phosphorus based functional group, and boron based functional groups. The oxygen based functional groups are added on the surface of graphene ceramic nano-composite material by heating the graphene nano-composite material in an ambient air (calcination) and a chemical treatment. The sulphur based functional groups, nitrogen based functional groups, halogen based functional group, phosphorus based functional group, and boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

According to one embodiment herein, the back plug and front plug pack the grapheme ceramic nano-composite material. The back plug keeps the grapheme ceramic nano-composite material in the filtration column. The back plug and front plug pack the graphene ceramic nano-composite material. The back plug keeps the grapheme ceramic nano-composite material in the filtration column. The front plug is fabricated from cellulose acetate. The back plug is fabricated from cellulose acetate or a plastic mesh tightly fitted into the mouth piece with the help of plastic pipe smaller in diameter than the filter casing.

According to one embodiment herein, the cylindrical pipe to fix the cigarette is designed to fit with a plurality of smoking products. The cylindrical pipe to fix the cigarette is tapered from inside to fit a cigarette.

According to one embodiment herein, a graphene based filter for use with tobacco products is provided, which is a standalone product in itself and is attachable to any brand, class or grade of tobacco smoking products such as, cigarettes, cigars, cigarillos, little cigars, bidis, hookah, kreteks, tobacco pipes, e-cigarettes, etc.

According to one embodiment herein, a graphene-ceramic nano-composite based material, in granular or sintered ceramic form is used as a filter for tobacco products. The graphene ceramic nano-composite material is directly filled in a granular form in the filtration column or the graphene ceramic nano-composite material is die-compacted into a cylindrical column. The cylindrical column comprising a die compacted graphene ceramic nano-composite material is sintered. After sintering the cylindrical column comprising a die compacted graphene ceramic nano-composite material is fitted into the filtration column. The graphene-based nano-composite is chemically functionalized by addition of functional groups and nano-particles for removal of tar and organic toxic compounds, with minimal impact on nicotine content.

According to one embodiment herein, a graphene based filter casing for tobacco products is provided. The casing holds graphene nano-composite material and allows effective mixing of atmospheric oxygen into the smoke, which reduces carbon-monoxide concentration in the smoke.

According to one embodiment herein, a process is provided for economically viable synthesis of graphene nano-composite material with cost effective precursor materials.

According to one embodiment herein, a process for synthesis of graphene based nano-composite material for cigarette filter is provided. The process comprises the following steps: ceramic component is pre-annealed and treated for decontamination and surface activation. The carbon based material is coated on ceramic particles and dried. The coated carbon material is carbonized into amorphous carbon. The ceramic particles coated with carbon material are structurally segregated based on size of the particles, shape and die compaction, etc. The carbon layers are annealed in inert atmosphere for conversion of amorphous carbon to graphene structure and the nano-composite is sintered. The graphene ceramic nano-composite material is directly filled in a granular form in the filtration column or the graphene ceramic nano-composite material is first die-compacted into a cylindrical column. The cylindrical column comprising a die compacted graphene ceramic nano-composite material is sintered. The sintered cylindrical column comprising a die compacted graphene ceramic nano-composite material is fitted into the filtration column. The surface of the nano-composite is activated through chemical treatment. The graphene based nano-composite smoke filter is fabricated by packing graphene material into a pipe like casing.

According to one embodiment herein, an attachable-detachable type of cigarette filter is provided. The filter comprises mouth piece, filtration column, cigarette holding section, back plug, graphene nano-composite for filtration, plastic casing, front plug and cylindrical pipe to fix the cigarette. The back plug composed of cellulose acetate or other porous material is fitted in the mouth piece in the plastic casing, The graphene nano-composite material is then filled in the filtration column, and the filter is sealed by another back plug of cellulose acetate or other porous material. The graphene nano-composite cigarette filter is ready for use and cigarette for smoking is plugged in the cylindrical pipe in the cigarette holding section.

According to one embodiment herein, a disposable type graphene based cigarette filter that is fixed to the cigarette is provided. The embodiment comprises filtration part, tobacco part, back plug, graphene nano-composite material and front plug. During the manufacturing of the cigarette, instead of placing a complete cellulose acetate plug in the filter part, a smaller plug of cellulose acetate or other porous material is placed as the front plug, following which the graphene nano-composite material is filled and is sealed by a back plug of cellulose acetate or other porous material. The cigarette is smoked like any other conventional cigarette.

According to one embodiment herein, a mechanism for smoking using the graphene based cigarette filter and for a flow of smoke is provided. The embodiment provides a filtered smoke through an attachable-detachable type reusable graphene based filter. Any usual cigarette is attached with the filter for enabling the smoke to passing through the filter. The cigarette is attached to the filter by plugging it into the cylindrical pipe. As the cigarette is lit and air is sucked through the filter by the user through the mouth piece, fresh air is sucked into the cigarette. The cigarette burns and generates two components of smoke, the smoke that passed through the unburnt cigarette and the passive smoke. The smoke passing through the cigarette passes through the filtration column of the filter and produces filtered smoke with reduced tar and organic carcinogen content. Depending on the toxins or the compounds to be adsorbed from cigarette smoke, a plurality of functional groups are incorporated onto the surface of the graphene ceramic nano-composite material by a chemical functionalization. The functional groups are selected from a group consisting of oxygen-based functional groups, Sulphur based functional groups, Nitrogen based functional groups, Halogen based functional group, Phosphorus based functional group, and Boron based functional groups. The oxygen-based functional groups are added on the surface of graphene ceramic nano-composite material by heating the graphene nano-composite material in an ambient air (calcination) and a chemical treatment. The Sulphur based functional groups, Nitrogen based functional groups, Halogen based functional group, Phosphorus based functional group, and Boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

According to one embodiment herein, a graphene-based nano-composite is synthesized for application in a filter for cigarette and other tobacco smoke, by reducing the tar content and the organic carcinogenic compounds contents of the smoke. The graphene based ceramic nano-composite material is synthesized by starting with a ceramic reinforcing material such as silica sand, alumina sand or other metal oxide ceramics in particulate form. The ceramic material in particulate form is first washed with water and acid such as, nitric acid followed by annealing at 600 to 900° C. (Step 1). This decontaminates the ceramic and activates the surface of the particles. Following this process, the ceramic particles are coated with carbon precursor such as sugar, tar, asphalt, etc. using a suitable solvent such as water, ethanol, hexane, etc. (Step 2). Then, the carbon precursor is carbonized by heating the coated ceramic particles at 200 to 400° C. in air (Step 3). The carbon coated ceramic particles are segregated based on their particle size, particle shape and die compaction (Step 4). Further, the ceramic particles coated with amorphous carbon are annealed in a controlled atmosphere (Argon, Nitrogen, Hydrogen, etc) at 600 to 900° C. (Step 5). This forms graphitic carbon layers (Graphene) on the ceramic particles. Final step of graphene nased nano-composite material formation involves acid treatment using sulphuric acid, hydrochloric acid and nitric acid to chemically activate the graphene layers and make them porous for improved chemisorption (Step 6). Once the graphene based nano-composite is ready to be filled in the plastic casing to form the filtration column in the attachable-detachable type filter or filter part in the fixed type filter.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
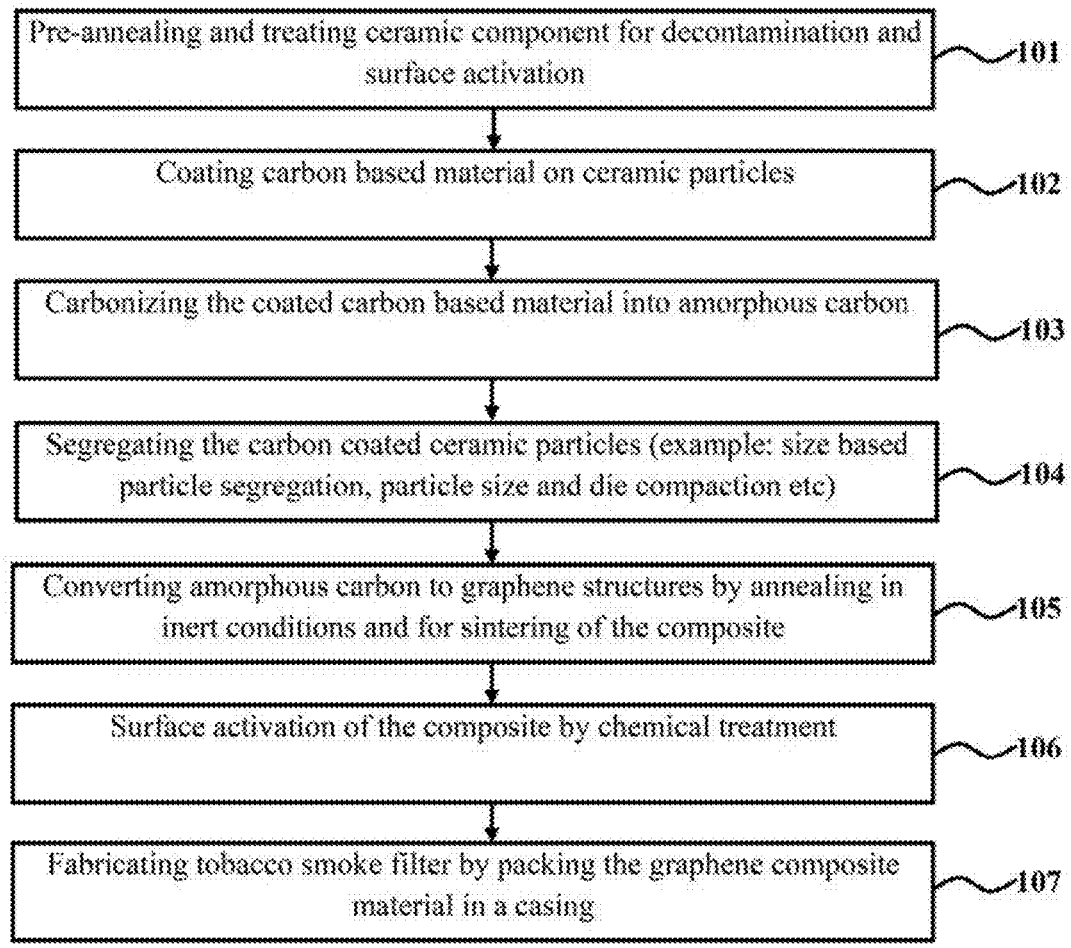
FIG. 1 illustrates a flow chart explaining a generalized process for synthesizing the graphene based filter material, according to one embodiment herein.

Although the specific features of the embodiment herein are shown in some drawings and not in others. This is done for convenience only as each feature may be combined with any or all of the other features in accordance with the embodiment herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a graphene based filter, which removes tar and toxic chemical compounds from tobacco smoke and provides a safe smoking alternative for smokers.

According to one embodiment herein, a method of fabricating a cigarette filter made of graphene ceramic nano-composite material is provided. The method comprises the following steps. The ceramic material is washed with an acid. The acid de-contaminates the surface of ceramic material. The acid activates the surface of the ceramic material. The acid is taken in a pre-determined concentration. The pre-determined concentration of the acid is in the range of 10-60% v/v. The ceramic particles are annealed at a pre-determined temperature range. The pre-determined temperature range is 600-900° C. The ceramic particles are coated with a carbon precursor using a solvent to obtain coated ceramic particles. The ceramic particles are mixed with carbon precursor in a liquid phase or a dispersion phase. After mixing the carbon precursor, solvent and the ceramic particles the carbon precursor is dried by heating at a pre-determined temperature range. The concentration of carbon precursor is in a range of 5-20% w/w. The carbon precursor present on the surface of the ceramic particles is carbonized by heating at a pre-determined temperature range in air. The heating converts the carbon precursor into amorphous carbon layer. The pre-determined temperature range is 200-400° C. After heating, the ceramic particles coated with amorphous carbon are obtained. The ceramic particles coated with amorphous carbon are segregated based on particle size and particle shape. The ceramic particles coated with amorphous carbon are segregated based on the particle size in a range of 300-900 microns in diameter. The ceramic particles coated with amorphous carbon are segregated based on a circular shape with irregular and uneven surface. The ceramic particles coated with amorphous carbon are annealed at a predetermined temperature range in an inert atmospheric condition. The annealing converts the amorphous carbon into graphene. The predetermined temperature range is 600-900° C. The inert atmosphere comprises argon, nitrogen and hydrogen. The annealing yields ceramic particles with graphene or graphene nano-composite material. The ceramic particles with graphene or graphene ceramic nano-composite material are chemically treated for activation of surface. The chemical treatment is an acid treatment. The acid is selected from a group consisting of sulphuric acid, hydrochloric acid and nitric acid. The acid treatment makes the graphene layers porous and increases chemisorptions or adsorption of a plurality of toxic compounds from cigarette smoke. The toxic compounds adsorbed are ammonia, formaldehyde, mainstream total particulate matter (MS-TPM), nicotine, tar and nitrosamines. Depending on the toxins or the compounds to be adsorbed from cigarette smoke, a plurality of functional groups are incorporated onto the surface of the graphene ceramic nano-composite material by a chemical functionalization. The functional groups are selected from a group consisting of oxygen-based functional groups, Sulphur based functional groups, Nitrogen based functional groups, Halogen based functional group, Phosphorus based functional group, and Boron based functional groups. The oxygen-based functional groups are added on the surface of graphene ceramic nano-composite material by heating the graphene nano-composite material in an ambient air (calcination) and a chemical treatment. The Sulphur based functional groups, Nitrogen based functional groups, Halogen based functional group, Phosphorus based functional group, and Boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

A tobacco smoke filter is fabricated by packing the graphene ceramic nano-composite material into a pipe like casing. The graphene ceramic nano-composite material is filled in an amount of 0.5-1.5 grams. The graphene ceramic nano-composite material is either directly filled in granular form or first die-compacted into a cylindrical column, then sintered and then fitted into the filtration column. The graphene ceramic nano-composite material is directly filled in a granular form in the filtration column or the graphene ceramic nano-composite material is die-compacted into a cylindrical column. The cylindrical column comprising a die compacted graphene ceramic nano-composite material is sintered. The sintered cylindrical column comprising a die compacted graphene ceramic nano-composite material is fitted into the filtration column.

According to one embodiment herein, the ceramic material is selected from a group consisting of silica, alumina, titanium oxide and zirconium oxide.

According to one embodiment herein, the carbon precursor is selected from a group consisting of sugar, tar and asphalt.

According to one embodiment herein, the solvent is selected from a group consisting of water, ethanol and hexane.

According to one embodiment herein, the graphene ceramic nano-composite material filter for cigarette tobacco smoke comprises a mouth piece, a filtration column, a front plug, a back plug, a cigarette holding section and a cylindrical pipe to fix the cigarette. The filtration column comprises grapheme ceramic nano-composite material. The filtration column is positioned between the front plug and the back plug.

According to one embodiment herein, an amount of the graphene ceramic nano-composite material filled in the filtration column is in a range of 0.5-1.5 grams.

According to one embodiment herein, the front plug and the back plug are fabricated from porous material. One of the porous materials suitable for this application is cellulose acetate.

According to one embodiment herein, the graphene ceramic nano-composite material filter is designed to adsorb the toxic compounds from cigarette smoke. The toxic compounds adsorbed from cigarette smoke are ammonia, formaldehyde, mainstream total particulate matter (MS-TPM), nicotine, tar and nitrosamines. Depending on the toxins or the compounds to be adsorbed from cigarette smoke, a plurality of functional groups are incorporated onto the surface of the graphene ceramic nano-composite material by a chemical functionalization. The functional groups are selected from a group consisting of oxygen-based functional groups, Sulphur based functional groups, Nitrogen based functional groups, Halogen based functional group, Phosphorus based functional group, and Boron based functional groups. The oxygen-based functional groups are added on the surface of graphene ceramic nano-composite material by heating the graphene nano-composite material in an ambient air (calcination) and a chemical treatment. The Sulphur based functional groups, Nitrogen based functional groups, Halogen based functional group, Phosphorus based functional group, and Boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

According to one embodiment herein, the back plug and front plug pack the grapheme ceramic nano-composite material. The back plug keeps the grapheme ceramic nano-composite material in the filtration column. The back plug and front plug pack the graphene ceramic nano-composite material. The back plug keeps the grapheme ceramic nano-composite material in the filtration column. The front plug is fabricated from cellulose acetate. The back plug is fabricated from cellulose acetate or a plastic mesh tightly fitted into the mouth piece with the help of plastic pipe smaller in diameter than the filter casing.

According to one embodiment herein, the cylindrical pipe to fix the cigarette is designed to fit with a plurality of smoking products. The cylindrical pipe to fix the cigarette is tapered from inside to fit a cigarette.

According to one embodiment herein, a graphene based filter for use with tobacco products is provided, which is a standalone product in itself and is attachable to any brand, class or grade of tobacco smoking products such as, cigarettes, cigars, cigarillos, little cigars, bidis, hookah, kreteks, tobacco pipes, e-cigarettes, etc.

According to one embodiment herein, a graphene-ceramic nano-composite based material, in granular or sintered ceramic form is used as a filter for tobacco products. The graphene ceramic nano-composite material is directly filled in a granular form in the filtration column or the graphene ceramic nano-composite material is first die-compacted into a cylindrical column. The cylindrical column comprising a die compacted graphene ceramic nano-composite material is sintered. The sintered cylindrical column comprising a die compacted graphene ceramic nano-composite material is fitted into the filtration column.

The graphene-based nano-composite is chemically functionalized by addition of functional groups and nano-particles for removal of tar and organic toxic compounds, with minimal impact on nicotine content.

According to one embodiment herein, a plastic filter casing for tobacco products is specifically designed to hold graphene based ceramic nano-composite material and to perfectly fit onto various types of smoking tobacco products.

According to one embodiment herein, a process is provided for economically viable synthesis of graphene nano-composite material with cost effective precursor materials.

According to one embodiment herein, a process for synthesis of graphene based nano-composite material for cigarette filter is provided. The process comprises the following steps: ceramic component is pre-annealed and treated for decontamination and surface activation. The carbon based material is coated on ceramic particles and dried. The coated carbon material is carbonized into amorphous carbon. The ceramic particles coated with carbon material are structurally segregated based on size of the particles and shape, etc. The carbon layers on the ceramic particles are chemically functionalized. The carbon layers are annealed in inert atmosphere for conversion of amorphous carbon to graphene structure and the nano-composite is sintered. The graphene ceramic nano-composite material is directly filled in a granular form in the filtration column or the graphene ceramic nano-composite material is first die-compacted into a cylindrical column. The cylindrical column comprising a die compacted graphene ceramic nano-composite material is sintered. The sintered cylindrical column comprising a die compacted graphene ceramic nano-composite material is fitted into the filtration column. The surface of the nanocomposite is activated through chemical treatment. The graphene based nano-composite smoke filter is fabricated by packing graphene material into a pipe like casing.

According to one embodiment herein, an attachable-detachable type of cigarette filter is provided. The filter comprises mouthpiece, filtration column, cigarette holding section, back plug, graphene nano-composite for filtration, plastic casing, front plug and cylindrical pipe to fix the cigarette. The back plug composed of cellulose acetate or other porous material is fitted in the mouthpiece in the plastic casing. The graphene nano-composite material is then filled in the filtration column, and the filter is sealed by another back plug of cellulose acetate or other porous material. The graphene nano-composite cigarette filter is ready for use and cigarette for smoking is plugged in the cylindrical pipe in the cigarette holding section.

According to one embodiment herein, a disposable type graphene based cigarette filter that is fixed to the cigarette is provided. The embodiment comprises filtration part, tobacco part, back plug, graphene nano-composite material and front plug. During the manufacturing of the cigarette, instead of placing a complete cellulose acetate plug in the filter part, a smaller plug of cellulose acetate or other porous material is placed as the front plug, following which the graphene nano-composite material is filled and is sealed by a back plug of cellulose acetate or other porous material. The cigarette is smoked like any other conventional cigarette.

According to one embodiment herein, a mechanism for smoking using the graphene based cigarette filter and for a flow of smoke is provided. The embodiment provides a filtered smoke through an attachable-detachable type reusable graphene based filter. Any usual cigarette is attached with the filter for enabling the smoke to passing through the filter. The cigarette is attached to the filter by plugging it into the cylindrical pipe. As the cigarette is lit and air is sucked through the filter by the user through the mouthpiece, fresh air is sucked into the cigarette. The cigarette burns and generates two components of smoke, the smoke that passed through the unburnt cigarette and the passive smoke. The smoke passing through the cigarette passes through the filtration column of the filter and produces filtered smoke with reduced tar and organic carcinogen content.

According to one embodiment herein, a graphene-based nano-composite is synthesized for application in a filter for cigarette and other tobacco smoke, by reducing the tar content and the organic carcinogenic compounds contents of the smoke. The graphene based ceramic nano-composite material is synthesized by starting with a ceramic reinforcing material such as silica sand, alumina sand or other metal oxide ceramics in particulate form. The ceramic material in particulate form is first washed with water and acid such as, nitric acid followed by annealing at 600 to 900° C. (Step 1). This decontaminates the ceramic and activates the surface of the particles. Following this process, the ceramic particles are coated with carbon precursor such as sugar, tar, asphalt, etc. using a suitable solvent such as water, ethanol, hexane, etc. (Step 2). Then, the carbon precursor is carbonized by heating the coated ceramic particles at 200 to 400° C. in air (Step 3). The carbon coated ceramic particles are segregated based on their particle size and particle shape (Step 4). Further, the ceramic particles coated with amorphous carbon are annealed in a controlled atmosphere (Argon, Nitrogen, Hydrogen, etc) at 600 to 900° C. (Step 5). This forms graphitic carbon layers (Graphene) on the ceramic particles. Final step of graphene based nano-composite material formation involves acid treatment using sulphuric acid, hydrochloric acid and nitric acid to chemically activate the graphene layers and make them porous for improved chemisorption (Step 6). Once the graphene based nano-composite is ready to be filled in the plastic casing to form the filtration column in the attachable-detachable type filter or filter part in the fixed type filter. The graphene ceramic nano-composite material is directly filled in a granular form in the filtration column or the graphene ceramic nano-composite material is first die-compacted into a cylindrical column. The cylindrical column comprising a die compacted graphene ceramic nano-composite material is sintered. The sintered cylindrical column comprising a die compacted graphene ceramic nano-composite material is fitted into the filtration column.

FIG. 1 illustrates the process for synthesis of graphene based nano-composite material for cigarette filter in a stepwise manner, according to one embodiment herein. The first step is pre-annealing and treatment of ceramic component for decontamination and surface activation (101). The acid is in a concentration of 10-60% v/v is used for the pre-annealing and treatment of the ceramic component. The volume of the acid is 10-20 times more than the ceramic component. The ceramic material is selected from a group consisting of silica, alumina, titanium oxide and zirconium oxide. The temperature for annealing is in a range of 600–900° C. The carbon based material is coated on ceramic particles and dried (102). The carbon-based material is coated on ceramic particles using a suitable solvent. The ceramic particles are rigorously mixed with carbon-based material/precursor (either in liquid phase or dispersion phase). The carbon-based material/precursor is dried using heat to coat the ceramic particles with precursor. The amount of carbon precursor taken for coating the ceramic particles is 5-20% w/w (dry weight). The ceramic particles are coated with carbon-based material/precursor such as sugar, tar, asphalt, etc. using a suitable solvent such as water, ethanol, hexane, etc. The coated carbon based material is carbonized into amorphous carbon (103). The carbon based material/precursor is carbonized by heating the coated ceramic particles at 200 to 400° C. in air. The carbon coated ceramic particles are segregated based on their particle size and particle shape (104). The particles are segregated based on the size of 300-900 microns in diameter and preferable shape is circular with irregular or uneven surface. The amorphous carbon to graphene structure is converted by annealing in inert atmosphere and for sintering of the composite (105). The amorphous carbon to graphene structure is converted by annealing in inert atmosphere comprising (Argon, Nitrogen, Hydrogen, etc) at a temperature of 600 to 900° C. The composite is chemically treated for surface activation (106). The graphene nano-composite material formation involves acid treatment using sulphuric acid, hydrochloric acid and nitric acid to chemically activate the graphene layers and make them porous for improved chemisorptions. The acid is taken 3 to 10 times the amount of graphene nano-composite material. The tobacco smoke filter is fabricated by packing the graphene nano-composite material into the pipe like casing (107). The graphene nano-composite material is filled in an amount of 0.5-1.5 gram.

According to one embodiment herein, the functional groups to be incorporated on the graphene surface are selected based on the toxins or compounds, which are to be adsorbed from the smoke. Depending upon the toxins or compound the functional groups are incorporated having affinity towards these compounds onto the graphene via chemical functionalization. The oxygen based functional groups are added by heating the graphene nano-composite in an ambient air (calcination) and chemical treatment. Similarly, any one of Sulphur, Nitrogen, Halogen, Phosphorous, and Boron containing functional groups are added by chemical treatment specific to the desirable functional group. Depending on the toxins or the compounds to be adsorbed from cigarette smoke, a plurality of functional groups are incorporated onto the surface of the graphene ceramic nano-composite material by a chemical functionalization. The functional groups are selected from a group consisting of oxygen-based functional groups, Sulphur based functional groups, Nitrogen based functional groups, Halogen based functional group, Phosphorus based functional group, and Boron based functional groups. The oxygen-based functional groups are added on the surface of graphene ceramic nano-composite material by heating the graphene nano-composite material in an ambient air (calcination) and a chemical treatment. The Sulphur based functional groups, Nitrogen based functional groups, Halogen based functional group, Phosphorus based functional group, and Boron based functional groups are added on the surface of graphene ceramic nano-composite material by a chemical treatment specific to the desirable functional groups. The functional groups are added on the surface of graphene ceramic nano-composite material to remove a plurality of toxic compounds from cigarette smoke based on the affinity of toxic compounds towards the functional groups.

Figure 2:
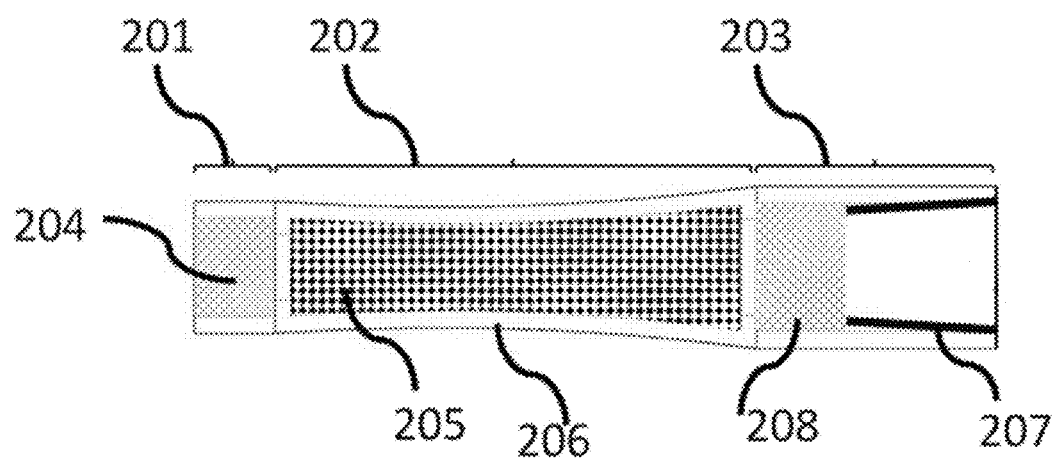
FIG. 2 illustrates a side view of the attachable-detachable type of graphene based nano-composite cigarette filter, according to one embodiment herein.

FIG. 2 illustrates a side view of the attachable-detachable type of graphene based nano-composite cigarette filter, according to one embodiment herein. The attachable-detachable type of graphene based nano-composite cigarette filter comprises a mouth piece 201, filtration column 202, cigarette holding section 203, back plug 204, graphene nano-composite 205 for filtration, plastic casing 206, front plug 208 and cylindrical pipe to fix the cigarette 207. The back plug 204 comprises either cellulose acetate or a plastic pipe with a diameter smaller than that of the plastic casing 206 of the filter to tightly fit a plastic mesh into the mouthpiece 201. The filtration column 202 comprises graphene nano-composite material 205, the filter is sealed by another back plug of cellulose acetate or other porous material such as mesh 204. The attachable-detachable type of graphene based nano-composite cigarette filter is ready for cigarette smoking, and a cigarette is plugged in the cylindrical pipe 207 of the cigarette holding section 203. The cylindrical pipe 207 of the cigarette holding section 203 to fix the cigarette is designed to fit plurality of smoking products. The cylindrical pipe 207 to fix the cigarette is tapered from inside to fit a cigarette.

According to one embodiment herein, the "filtration column" is the section of the filter where the graphene based nano-composite is present. The filtration or the removal of toxins from smoke takes place in the filtration column. The toxins are removed by the adsorption. The graphene based nano-composite or the smoke filtration column is packed between a "front plug" and a "back plug". The "back plug" is on the side of the filter, which goes into the mouth of the user. The back plug keeps the graphene nano-composite material packed inside the filtration column and prevents the graphene nano-composite material to enter into the mouth of the user. The "front plug" is a cellulose acetate plug on the cigarette holding side of the smoke filter that packs the graphene based nano-composite. The graphene nano-composite filters the smoke by adsorbing the toxins on its surface. The "mouth piece" is the section of the filter that helps the user to hold the filter in mouth attached/configured with the filtration column. The "cigarette holding section" comprises the front plug and the cigarette pipe. The "plastic casing" comprises and fits all the components specifically the back plug, graphene based nano-composite filter, front plug, a cylindrical pipe to fix the smoking article (cigarette or beedi etc). The "cylindrical pipe" to fix the smoking article (cigarette or beedi) is a cavity that tightly fits onto a smoking article. The "cylindrical pipe" is tapered from inside to fit tightly onto all brands of cigarettes which usually have minute variance in diameter.

Figure 3:
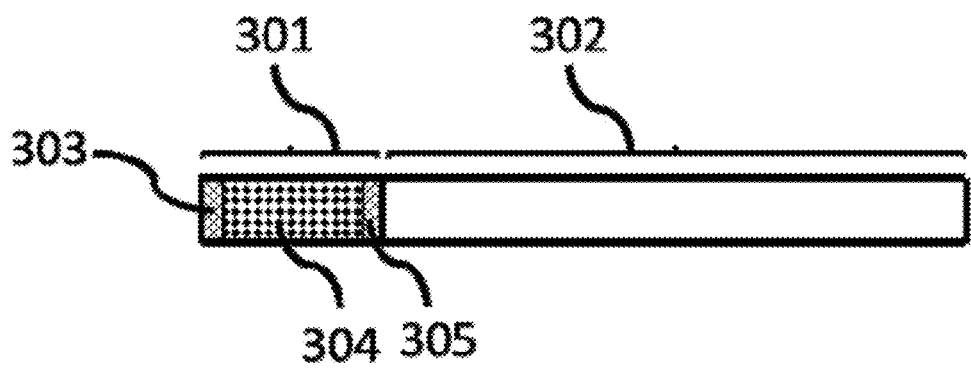
FIG. 3 illustrates a side view of a disposable type graphene based cigarette filter fixed to the cigarette, according to one embodiment herein.

FIG. 3 illustrates a side view of disposable type graphene based cigarette filter fixed to the cigarette, according to one embodiment herein. The disposable type graphene based cigarette filter fixed to the cigarette comprises filtration column 301, tobacco part 302, back plug 303, graphene composite material 304, front plug 305. During the manufacturing of the cigarette, instead of placing a complete cellulose acetate plug in the filtration column 301, a smaller plug of cellulose acetate or other porous material is placed as the front plug 305, following which the graphene composite material 304 is filled and which is sealed by a back plug 303 of cellulose acetate or other porous material. This disposable type graphene based cigarette filter fixed to the cigarette is smoked like any other conventional cigarette.

According to one embodiment herein, the "filtration column" is the section of the filter where the graphene based nano-composite is present. The filtration or the removal of toxins from smoke takes place in the filtration column. The toxins are removed by adsorption. The graphene based nano-composite or the smoke filtration column is packed between a "front plug" and a "back plug". The "back plug" is a cellulose acetate plug on the side of the filter which goes into the mouth of the user. The back plug keeps the graphene nano-composite material packed inside the filtration column and prevents the graphene nano-composite material to enter into the mouth of the user. The "front plug" is a cellulose acetate plug on the cigarette holding side of the smoke filter that packs the graphene based nano-composite. The graphene nano-composite filters the smoke by adsorbing the toxins on its surface. The "tobacco part" is the segment comprising the tobacco-containing segment of the smoking article or cigarette.

According to one embodiment herein, in the conventional cigarette the entire butt (filter portion) is fabricated from fibrous cellulose acetate. In the embodiment herein, the butt is modified by providing a small piece of fibrous cellulose acetate (front plug) after the tobacco portion of the cigarette. The front plug is followed by a graphene based nano-composite material and a back plug respectively. The back plug is also fabricated from fibrous cellulose acetate.

According to one embodiment herein, the graphene-based nano-composite is packed between the front plug and back plug fabricated from fibrous cellulose acetate. The fibrous cellulose acetate holds the graphene composite material in place.

Figure 4:
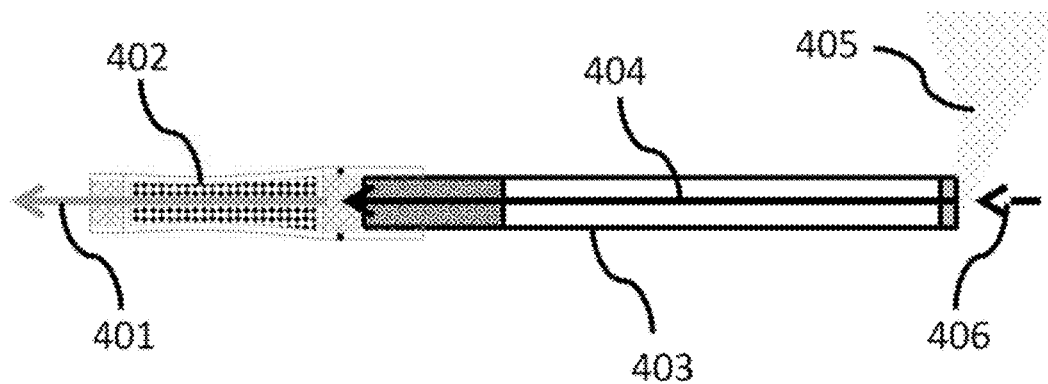
FIG. 4 illustrates a side view of the graphene based cigarette filter, according to one embodiment herein.

FIG. 4 illustrates the mechanism of smoking using the graphene based cigarette filter and the flow of smoke in the system, according to one embodiment herein. With respect to FIG. 4, filtered smoke 401 is received through the attachable-detachable type reusable graphene based filter 402 attached with a cigarette 403. Ambient air/fresh air 406 is sucked into the cigarette 403, and smoke 404 is passed through the cigarette 403, and passive smoke 405 is released from the cigarette 403. The cigarette 403 is attached to the filter 402 by plugging it into the cylindrical pipe. As the cigarette is lighted and air sucked through the filter 402 by the user via the mouth piece, fresh air 406 is sucked into the cigarette. The cigarette burns and generates two components of smoke, one is the smoke that passed through the unburnt cigarette 403 and the other is the passive smoke 405. The smoke passing through the cigarette 403 passes through the filter 402, which yields filtered smoke 401 with reduced tar and organic carcinogen content.

According to one embodiment herein, the graphene based cigarette filter provided in the embodiment herein provides the only solution to smokers for truly safer tobacco smoking. The filter reduces the tar content in the smoke, which would otherwise collect in the lungs and cause pulmonary problems. The filter also tremendously reduces the content of organic as well as inorganic carcinogens, respiratory irritants and other toxic chemicals from the inhaled smoke. Further, the filter is used with any form of cigarette or other tobacco smoking products without any change in the smoking habits of the user, such as, type of tobacco smoking product, brand, etc.

According to one embodiment herein, Table 1 given below illustrates a reduction in the ammonia content, formaldehyde content, mainstream total particulate matter (MS-TPM), nicotine, tar and nitrosamines after the cigarette smoke is passed from the graphene based nano-composite filter:

| Constituent | International Standard Test | Reduction In Percentage |
|---|---|---|
| Ammonia | HCT-101, HCT-201 | 30% |
| Formaldehyde | HCT-104 | 48% |
| MS-TPM | HCT-107, HCT-205 | 38% |
| Nicotine | HCT-115, FR 11178, FR46483 ISO10315, ISO10362-1, CRM #65, #66, #67 | 20% |
| Tar | HCT-212 | 35% |
| Nitrosamines | HCT-111 | Upto 30% |

(Key: FR = Federal Register/ISO = International Standards Organization/HC = Health Canada)

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method of fabricating graphene ceramic nano-composite material filter for cigarette tobacco smoke, the method comprises:
   washing ceramic material with an acid, and wherein the acid de-contaminates the surface of ceramic material and wherein the acid activates the surface of the ceramic material, and wherein the acid is taken in a pre-determined concentration, and wherein the pre-determined concentration of the acid is in a range of 10-60% v/v;
   annealing the ceramic particles at a predetermined temperature range, and wherein the pre-determined temperature range is 600-900° C.;
   coating the ceramic particles with a carbon precursor using a solvent to obtain a coated ceramic particles, and wherein the ceramic particles are mixed with carbon precursor in a liquid phase of a dispersion phase, and wherein after mixing the carbon precursor, solvent and the ceramic particles the carbon precursor is dried by heating at a pre-determined temperature range, and wherein the concentration of carbon precursor is in a range of 5-20% w/w;
   carbonizing the carbon precursor present on the surface of the ceramic particles by heating at a pre-determined temperature range in air, and wherein the heating converts the carbon precursor into an amorphous carbon, and wherein the pre-determined temperature range is 200-400° C., and wherein after heating the ceramic particles are obtained with a coating of amorphous carbon;
   segregating the ceramic particles coated with amorphous carbon based on particle size and particle shape, and wherein the ceramic particles coated with amorphous carbon are segregated based on the particle size in a range of 300-500 microns in diameter, and wherein the ceramic particles coated with amorphous carbon are segregated based on a circular shape with irregular and uneven surface;
   annealing the ceramic particles coated with amorphous carbon at a predetermined temperature range in an inert atmospheric condition, and wherein the annealing converts the amorphous carbon into graphene, and wherein the predetermined temperature range is 600-900° C., and wherein the inert atmospheric condition comprises argon, nitrogen and hydrogen, and wherein annealing yields graphene ceramic nano-composite material;
   chemically treating the graphene ceramic nano-composite material for activation of surface, and wherein the chemical treatment is an acid treatment, and wherein the acid is selected from a group consisting of sulphuric acid, hydrochloric acid and nitric acid, and wherein acid treatment makes a plurality of graphene layers porous and increases chemisorptions or adsorptions of a plurality of toxic compounds from cigarette smoke, and wherein the toxic compounds adsorbed are ammonia, formaldehyde, mainstream total particulate matter (MS-TPM), nicotine, tar and nitrosamines; and
   fabricating a tobacco smoke filter by packing the graphene ceramic nano-composite material in a casing with a pipe structure to form a filtration column, and wherein the graphene nano-composite material is filled in an amount of 0.5-1.5 grams, an wherein the graphene ceramic nano-composite material is directly filled in a granular form in the filtration column or the graphene ceramic nano-composite material is first die-compacted into a cylindrical column, and wherein the cylindrical column comprising a die compacted graphene ceramic nano-composite material is sintered and wherein the sintered cylindrical column comprising a die compacted graphene ceramic nano-composite material is fitted into the filtration column.

2. The method according to claim 1, wherein the ceramic material is selected from a group consisting of silica, alumina, titanium oxide and zirconium oxide.

3. The method according to claim 1, wherein the carbon precursor is selected from a group consisting of sugar, tar and asphalt.

4. The method according to claim 1, wherein the solvent is selected from a group consisting of water, ethanol and hexane.

\* \* \* \* \*